United States Patent [19]
Pastore

[11] Patent Number: 5,922,195
[45] Date of Patent: Jul. 13, 1999

[54] TRASH RACK WITH NON-METALLIC REINFORCING ROD

[76] Inventor: Joseph Pastore, 2816 W. Crowne Point Blvd., Naples, Fla. 39104

[21] Appl. No.: 08/944,283

[22] Filed: Oct. 6, 1997

[51] Int. Cl.$^6$ .............................. E02B 5/08; B01D 39/14; B01D 39/16; B01D 29/03
[52] U.S. Cl. ......................... 210/154; 210/162; 210/232
[58] Field of Search ................................... 210/162, 154, 210/170, 232

[56] References Cited

U.S. PATENT DOCUMENTS

| | | |
|---|---|---|
| 1,984,891 | 12/1934 | Miick . |
| 2,996,189 | 8/1961 | Salterbach . |
| 4,582,601 | 4/1986 | Strow . |
| 4,645,598 | 2/1987 | Hannum . |
| 4,846,966 | 7/1989 | Pastore . |

FOREIGN PATENT DOCUMENTS 7-300837  11/1995  Japan .

*Primary Examiner*—Thomas M. Lithgow
*Attorney, Agent, or Firm*—Allen D. Brufsky

[57] ABSTRACT

A trash rack for filtering large volumes of intake water generally of the type available to power-generating facilities. The trash rack includes reinforcing rods fabricated of non-metallic materials in a pultrusion fabrication process. The pultruded reinforcing rods are substantially lighter than prior steel reinforcing rods. The pultruded rods are flexible enough to give under impact and high-loading without fracture or permanent distortion, yet are strong enough to withstand the type of loading commonly experienced by such large-volume trash racks.

10 Claims, 2 Drawing Sheets

TRASH RACK WITH NON-METALLIC REINFORCING ROD

BACKGROUND OF THE INVENTION

1. Field of the Invention

The present invention relates to devices for gross filtering of intake water needed by systems demanding a large flow of water free of large-sized debris. More particularly, the present invention relates to grates or trash racks fabricated with structural reinforcement for the strengthening of non-metallic members exposed to the water. The present invention includes a fiber-reinforced material formed in the shape of a rod as the reinforcing component of the trash rack.

2. Description of the Prior Art.

For many years, water intake systems have been filtered using trash racks made of metal, steel in particular. More recently, there has been increasing interest in the use of trash racks made substantially of non-metallic materials. The inventor of the present invention obtained U.S. Pat. No. 4,846,966 on Jul. 11, 1989 (the Pastore patent) for such an improvement in trash rack design. The advantages of using non-metallic materials are described in that patent. The disclosure made in the Pastore patent regarding the deficiencies in the prior metal trash racks, and the disclosure of the advantages of fabricating the longitudinal members of non-metallic materials, are incorporated herein by reference.

Of particular concern to the present invention is the means for reinforcing the longitudinal elements of the Pastore non-metallic trash racks. Specifically, it is noted that Pastore teaches in his preferred embodiment the use of a coaxial structure including a central core of cast thermoset plastic or steel surrounded by a cylindrical sleeve. While that design is suitable, provided the steel central core is isolated from direct contact with water, it may be more complex than required. In addition, testing conducted subsequent to the grant of that patent indicates that cast thermoset plastic alone as the reinforcing component was too brittle to withstand the various significant static and dynamic loading applied to the trash racks. As a result, cast thermoset plastic was replaced with steel rods as the core in the Pastore trash racks.

It was also discovered that the non-metallic spacers used to space the longitudinal members of the rack apart were sufficient to isolate the steel reinforcing rod from water. It was determined that steel could be used to increase the structural integrity of the non-metallic racks without express concern as to ice and marine growth—provided the steel was not directly contacted by the water. However, as noted in the Pastore patent, steel has a much higher density than non-metallic materials. Therefore, although the Pastore trash rack is formed substantially of non-metallic materials and is therefore of much lighter weight than equivalently-sized prior metal trash racks, the continuing use of steel makes these racks heavier than they otherwise may be. Given the sizes of the trash racks—they may span rivers several hundred yards wide and wider—it would be advantageous to reduce their weight, but without detrimental effect on their usefulness.

A concern that has been discovered in using steel reinforcing rods is that steel does not have the "give" or flexibility to bounce back under high impact conditions. That is, when significantly-sized debris—such as a log or a dense pack of frazil ice—contacts the rack, it forces the rack to bend. Upon removal of that load, the rack may well remain contorted because the bent steel used to reinforce the longitudinal members will not rebound. Although steel has some small degree of elasticity, it is not sufficiently elastic, or flexible, to recover from some of the types of loads experienced by trash racks. Therefore, the use of steel rods, while aiding to strengthen the substantially non-metallic trash racks, may result in undesirable failure under some conditions. The distortion that may occur would require premature replacement or significant maintenance activities.

What is needed is a non-metallic trash rack that filters coarse debris at the intakes of power generating systems and other systems requiring large amounts of water. What is also needed is a non-metallic trash rack that is as light weight as possible. Further, what is needed is a non-metallic trash rack that will recover to substantially its original shape upon removal of a load of the type commonly associated with trash racks for large volume water intakes. Still further, what is needed is such a trash rack that will not fracture upon being impacted by debris or ice of the type associated with such systems.

SUMMARY OF THE INVENTION

It is an object of the present invention to provide a non-metallic trash rack that filters coarse debris at the intakes of power generating systems and other systems requiring large amounts of water. It is also an object of the present invention to provide a non-metallic trash rack that is as light weight as possible. Further, it is an object of the present invention to provide a non-metallic trash rack that will recover to substantially its original shape upon removal of a load of the type commonly associated with trash racks for large volume water intakes. Still further, it is an object of the present invention to provide a trash rack that will not fracture upon being impacted by debris or ice of the type associated with such systems.

These and other objectives are achieved in the present invention through the substitution of the prior reinforcing steel rods with rods that are sufficiently strong to withstand the loads expected, and flexible and elastic enough to give under the types of loads typically experienced by trash racks without fracturing. They are also sufficiently flexible to recover to substantially their original shape upon removal of such loading.

It was discovered that the introduction of a composite material including a fibrous material in a non-metallic material matrix as the reinforcing rod to replace the prior steel rod of the Pastore trash racks yielded a trash rack that was much better than expected, given the noted problem with the prior cast thermoset plastic reinforcing rod. Specifically, the reinforcing rod of the present invention is fabricated as a unitary piece using the technique known as pultrusion. The pultrusion process involves drawing a fibrous material such as glass, graphite, polyester, and the like, through a bath of the carrier matrix, which may be a resin such as isophthalic polyester or vinyl ester. Of course, those with knowledge of such compounds would be able to select similar materials suitable for the trash rack environment. After passing through the resin bath, the wetted fibers, which may be combined with a mat of the same or similar fibers prior to entering the resin bath, are pulled into a shaping unit. The shaping unit forms the wetted reinforcing material Into a shape similar to that desired in the final product. From the shaping unit the preformed material is drawn into a heated die for final shaping. The die is heated so as to cure the resin system, thereby locking the fibrous material into the matrix in the final shape of the product desired. The surface of the finished product is quite smooth and the "locking in" of the fibrous material is so effective that delamination is of little to no concern.

It is to be noted that the pultrusion process is a known technique for fabricating materials of construction. However, prior to the present applicant's experimentation with various compositions of fibrous material and the carrier matrix, the use of a non-metallic material as the primary reinforcement component in a trash rack had been considered inappropriate. It was determined that the carrier material provided strength for the rod. The reinforcing material enhanced that strength and reduced the brittleness of the carrier. Of course, the carrier or resin material may include modifiers in the formulation so as to reduce the brittleness, although in doing so the likely reduction in structural strength must be considered.

The pultruded rod of the present improvement invention results in a non-metallic trash rack that is essentially metal free. It weighs much less than a rack of equivalent size containing a metal rod and is therefore much easier to maneuver. The viscoelastic characteristics of the pultruded rod enable it to give under loading without fracture. It also enables it to rebound from significant additional loading. Further, there is a reduction in vibration of such racks as compared to steel-reinforced racks. Experimentation has determined that the introduction of a pultruded rod has substantially improved the structural and weight characteristics of the prior Pastore trash rack. These and other advantages of the present invention will be apparent upon review of the following detailed description, the accompanying drawings, and the appended claims.

DETAILED DESCRIPTION OF THE PREFERRED EMBODIMENT

Figure 1:
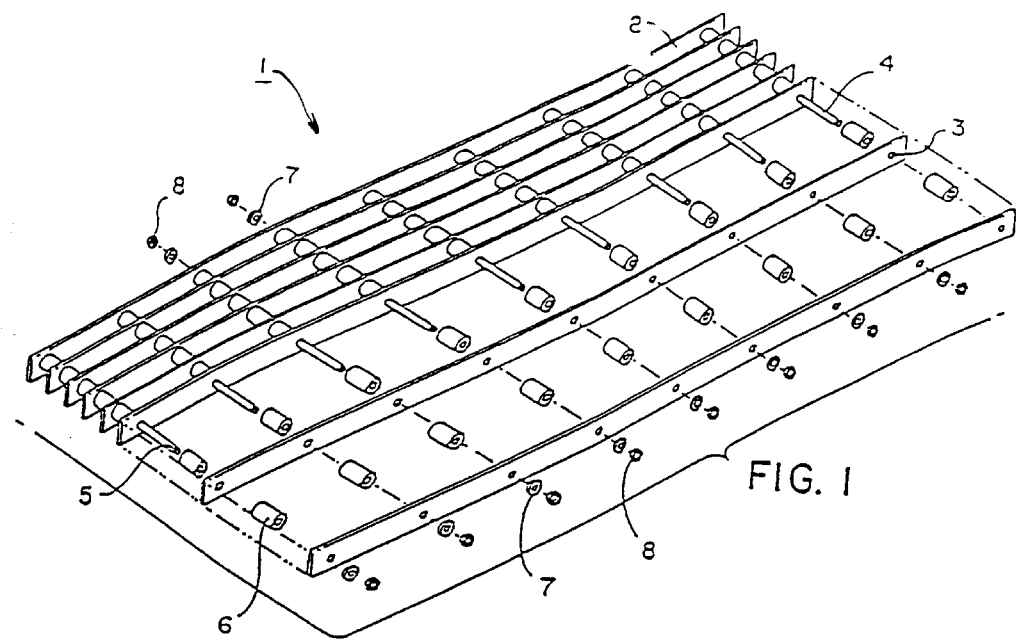
FIG. 1 is a perspective exploded view of the trash rack of the present invention including the pultruded reinforcing rods.

FIG. 1 illustrates the components of a trash rack 1 of the present invention, which components are substantially the same as the components described in the Pastore patent. Specifically, the trash rack 1 includes a plurality of longitudinal elements 2 having ports 3 for receiving transverse support rods 4 designed to reinforce the longitudinal elements 2. Spacers 6, which may be selected of a specific width of interest in order to set the spacing between adjacent longitudinal elements 2, encircle the support rods 4, and are fabricated of a non-metallic viscoelastic material. Between the width of the longitudinal elements 2 and the width of the spacers 6, the rods 4 are essentially encapsulated when the trash rack is put together as shown in FIG. 2.

When the prior trash racks were formed with steel rods, it was essential that they be encapsulated in order to seal nucleation sites suitable for ice and marine growth. However, the present invention involves the fabrication of the rods 4 as pultruded rods, preferably formed with glass fibers in a vinyl-ester resin matrix, although a polyester resin may be used. The pultrusion process yields a very smooth rod surface that minimizes nucleation sites, unlike steel rods and unlike standard compression molding techniques for non-metallic materials. In addition, there is no possibility of corrosion of the pultruded rods 4, unlike with steel rods. Further, the materials used to form the pultruded rods 4 is viscoelastic and has sufficient flexibility to ensure that it will substantially recover to its original shape after having been impacted by debris, or stress by tremendous water pressures., while supplying enough reinforcing strength to secure the trash rack 1 in place.

Figure 2:
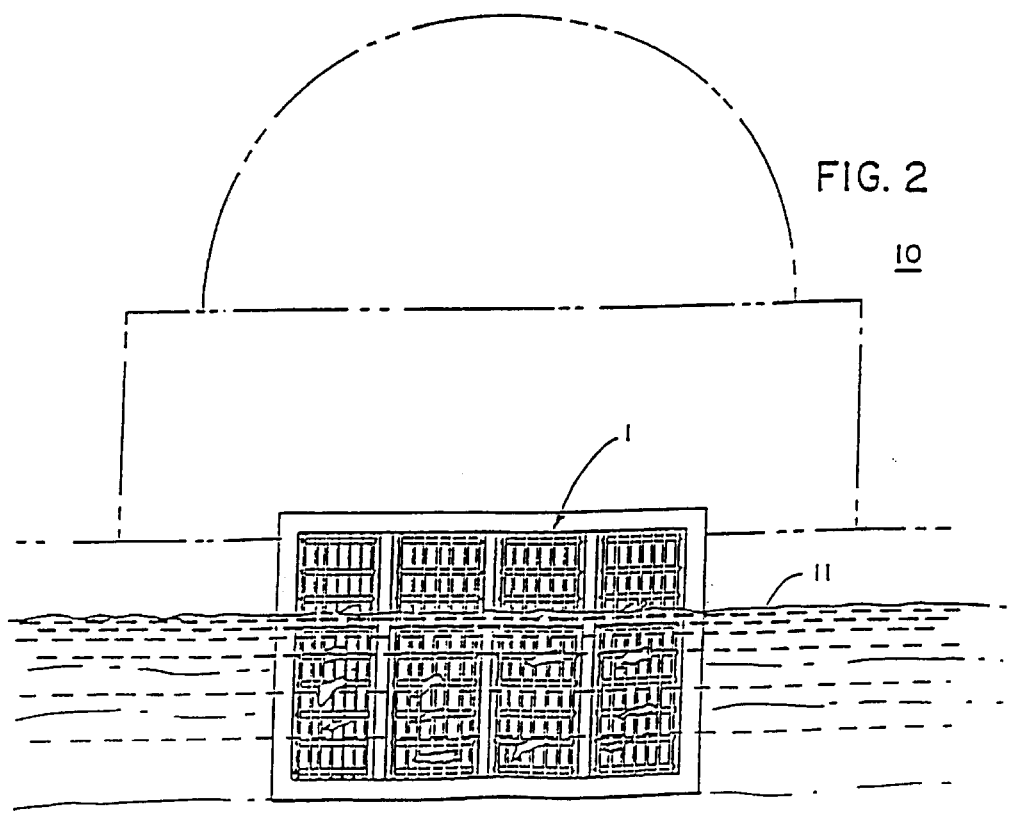
FIG. 2 is a simplified diagrammatic view of a trash rack in place in front of a power-generating facility.

Continuing with the description of FIG. 1, at least rod ends 5 of the rods 4 are preferably threaded so as to receive washers 7 and securing nuts 8 that are used to lock all of the components of the trash rack 1 in place water 11 for positioning in front of a power-generating facility 10, as shown in FIG. 2. The washers 7 and the nuts 8, may be made of any suitable material, although they are preferably made of a non-metallic material such as, but not limited to, that used to make the longitudinal elements 2 or the rods 4.

Figure 3:
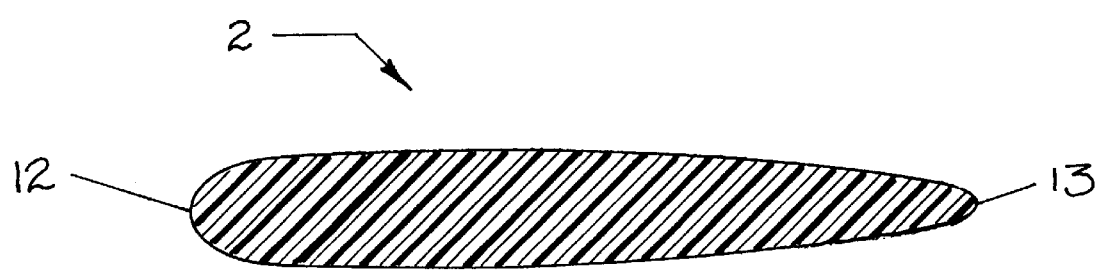
FIG. 3 is a cross-sectional view of a preferred design of the longitudinal elements of the trash rack of the present invention.

As illustrated in FIG. 3, the longitudinal elements 2 are preferably formed with a hydrodynamic shape such that a leading edge 12, which is the first part of the trash rack 1 to be contacted by the incoming water 11, is radially shaped. A trailing edge 13 is preferably more sharply shaped such that there is minimal turbulence as the water passes through the trash rack 1. The leading edge 12 may be shaped with a radius in the range of about 0.15" to 0.25", and preferably about 0.19". The trailing edge 13 may be shaped with a radius in the range of about 0.01" to 0.125", and preferably about 0.06". For most trash rack applications the longitudinal elements 2 may be as long as suitable for the structural requirements of the particular location where they are installed. They may be about 4" in width and about 0.5" in thickness. As indicated in the Pastore patent, they may be formed of any non-metallic material of sufficient hardness, strength, and elasticity necessary to resist the large forces to which the trash rack 1 is exposed, and sufficiently smooth that ice-nucleating centers and marine-growth anchors are effectively absent on the surface of the trash rack 1 when in place. The materials suitable for fabrication of the longitudinal elements 2 include, but are not limited to, polyurethanes in the Shore D hardness range of 60–95, as well as polyethylenes, polypropylenes, and any other non-metallic viscoelastic materials having similar structural characteristics.

Although the present invention has been described with particular reference to the preferred embodiment, it is to be understood that alternatives and equivalents in materials, design and methods may be made without departing from the spirit and scope of the invention.

I claim:

1. A trash rack for filtering large volumes of water, the trash rack comprising:
   a. a plurality of longitudinal elements fabricated of a non-metallic material;
   b. non-metallic means for establishing lateral spacing between adjacent ones of said longitudinal elements;
   c. reinforcing rods for linking said longitudinal elements together in a parallel fashion to form a stable grid, wherein said reinforcing rods are pultruded rods fabricated of one or more non-metallic materials; and
   d. means for joining said longitudinal elements, said means for establishing lateral spacing, and said reinforcing rods together.

2. The trash rack as claimed in claim 1 wherein said reinforcing rods are fabricated of a combination of fiberglass reinforcement and a polyester resin matrix.

3. The trash rack as claimed in claim 1 wherein said longitudinal elements are fabricated of a hydrodynamic shape.

4. The trash rack as claimed in claim 3 wherein each of said longitudinal elements include a leading edge and a trailing edge, wherein said leading edge is shaped with a radius in the range of about 0.15" to about 0.25".

5. The trash rack as claimed in claim 4 wherein said leading edge is shaped with a radius of about 0.19".

6. The trash rack as claimed in claim 5 wherein said trailing edge is shaped with a radius in the range of about 0.01" to about 0.125".

7. The trash rack as claimed in claim 6 wherein said trailing edge is shaped with a radius of about 0.06".

8. The trash rack as claimed in claim 1 wherein said means for joining said longitudinal elements, said means for establishing lateral spacing, and said reinforcing rods together, includes a pair of washers and a pair of nuts securable to ends of said reinforcing rods.

9. The trash rack as claimed in claim 8 wherein said washers and nuts are fabricated of a non-metallic material.

10. The trash rack as claimed in claim 1 wherein said longitudinal elements are fabricated of polyethylene.

* * * * *